Jan. 16, 1962    F. H. S. ROSSIRE    3,017,142
MANUAL CONTROLLER

Filed Jan. 13, 1956    3 Sheets-Sheet 1

INVENTOR.
FRANCIS HENRY S. ROSSIRE
BY
*Herbert J. Smith*
ATTORNEY

Jan. 16, 1962 F. H. S. ROSSIRE 3,017,142
MANUAL CONTROLLER

Filed Jan. 13, 1956 3 Sheets-Sheet 2

INVENTOR.
FRANCIS HENRY S. ROSSIRE
BY
ATTORNEY

Jan. 16, 1962    F. H. S. ROSSIRE    3,017,142
MANUAL CONTROLLER

Filed Jan. 13, 1956    3 Sheets-Sheet 3

INVENTOR.
FRANCIS HENRY S. ROSSIRE
BY
ATTORNEY

United States Patent Office 3,017,142
Patented Jan. 16, 1962

3,017,142
MANUAL CONTROLLER
Francis Henry S. Rossire, Leonia, N.J., assignor to The
Bendix Corporation, a corporation of Delaware
Filed Jan. 13, 1956, Ser. No. 559,064
8 Claims. (Cl. 244—77)

This invention relates to a controller, and more particularly to a novel controller for maneuvering an aircraft through an automatic control system and for synchronizing the controller with the system.

My U.S. Patent No. 2,616,305, an improvement on my U.S. Patent No. 2,614,776, describes a controller having a manually operable stick which is universally mounted in a gimbal frame. Displacement of the control stick fore and aft from a centered position controls the pitch attitude, and displacement of the control stick laterally controls the roll attitude of the craft, the attitude of the craft being proportioned to the displacement from center. The stick is held in its displaced position by a friction clutch arrangement and must be manually centered.

It is an object of the present invention to provide in an automatic pilot system, a novel controller which selectively controls the attitude and rate of change of attitude of the craft.

It is a further object of the invention to provide a novel stick controller for an automatic pilot system in which the stick may be driven to center position, or centered, automatically when released by the human pilot.

A further object of this invention is to provide a novel stick controller for an automatic pilot system wherein the stick is locked in and released from center position by electromagnetic means.

A further object of the present invention is to provide a novel controller for an automatic pilot system having a controller actuating means with a predetermined center position and wherein switches may be operated by movement of the actuating means from center position to render the elements of the control system effective or ineffective as desired.

A further object of the invention is to provide a novel controller for an automatic pilot system having a coupling arrangement between synchronizing motors and a universally mounted stick wherein the motors will restore the stick automatically to its center position upon release of the stick by the human pilot.

Another object of the invention is the provision of a controller utilizing a novel arrangement of slip clutches and irreversible gears for coupling synchronizing motors with a universally mounted stick.

The present invention contemplates a novel controller for an automatic pilot system which includes means selectively operable for placing the control system in two diffeernt modes of operation.

The contemplated arrangement of the invention also includes a manual controller of the stick type wherein the stick is normally locked in a center position and wherein the lock mechanism may be released electromagnetically, whereby the stick may be given universal movement.

The present invention also contemplates the use of motors for automatically restoring the stick to its center position under certain conditions of operation, and under other conditions of synchronizing the position of the stick with the relative operational conditions of the automatic pilot system. Further, irreversible drives and clutch arrangements are connected with these motors so that the universally movable stick of the controller may be displaced to maneuver the aircraft through the automatic pilot against the resistance of the motors, and wherein upon release of the stick by the human pilot said motors will automatically restore the stick to its center position.

The controller as contemplated also includes switches denoting the fore and aft and athwartship center positions of the controller stick for rendering various units of the system effective or ineffective as may be desired.

The aforementioned and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

Figure 1:
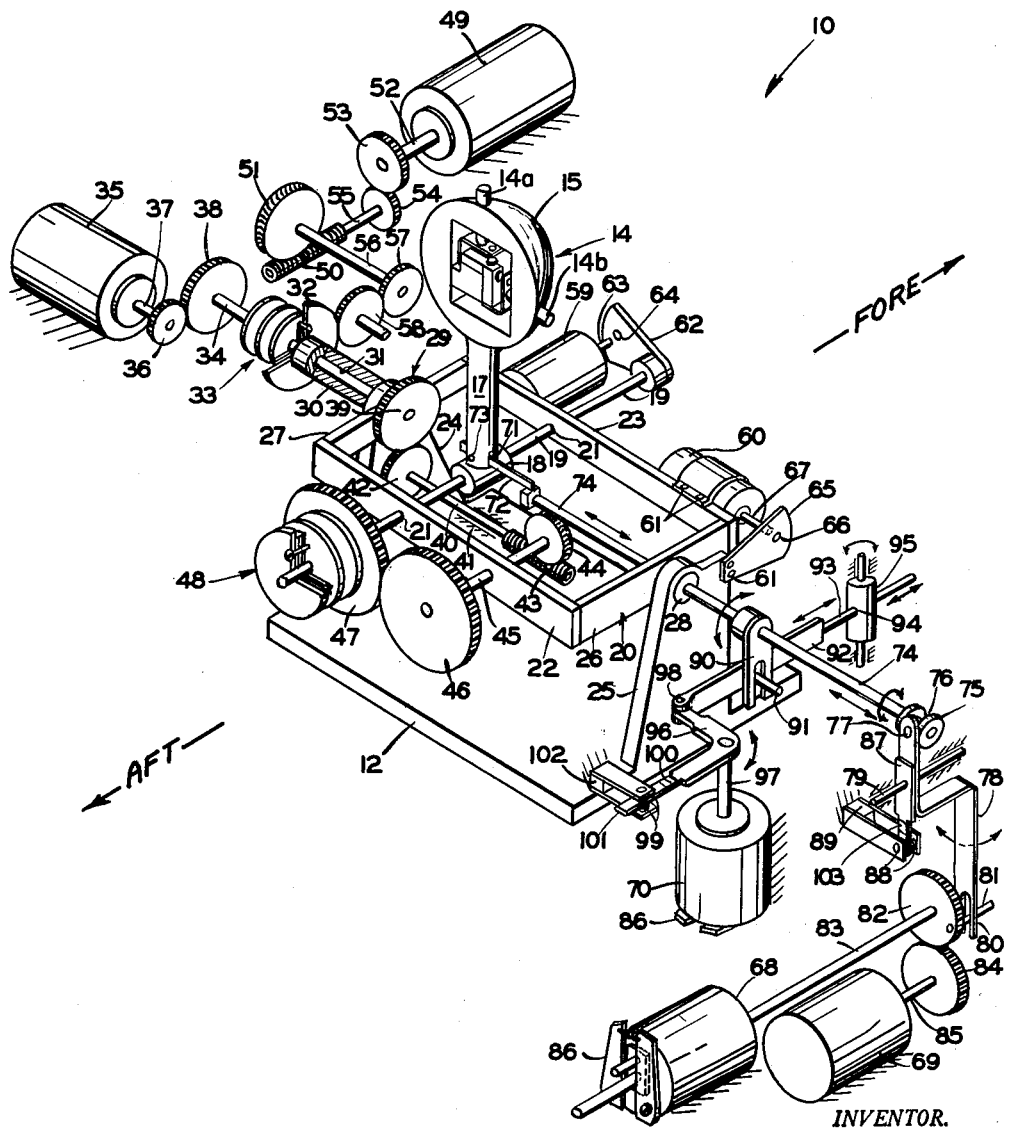
FIG. 1 is a diagram of the novel controller.
Figure 2:
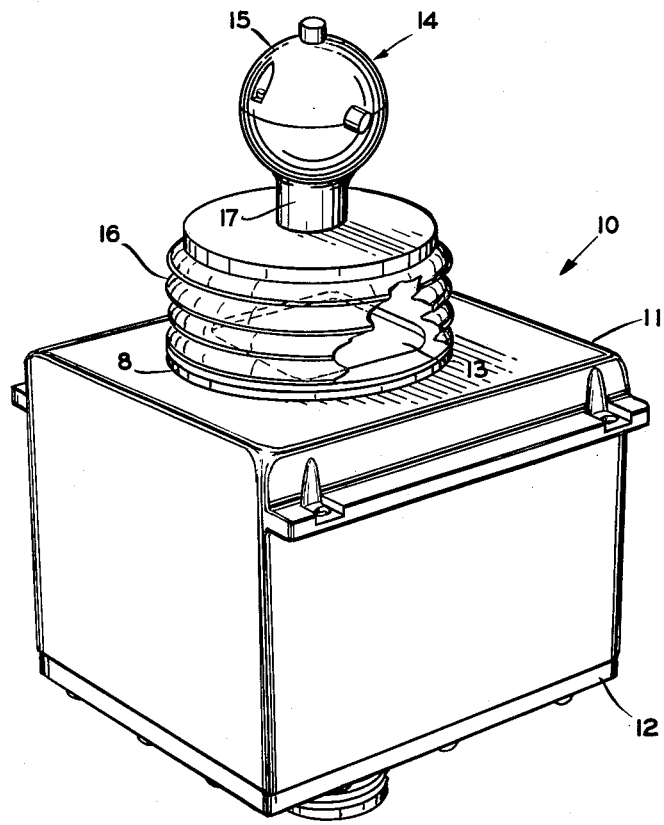
FIG. 2 is a perspective view of the encased controller with a portion of the Sylphon bellows broken away to show the limiting means of the stick.
Figure 3:
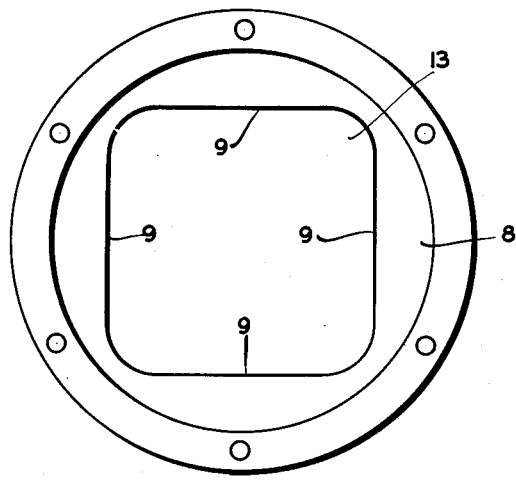
FIG. 3 is a top view of the plate having surfaces defining controller limiting means.

Referring now in detail to the drawings, and more particularly to FIGS. 1 and 2, the novel controller 10 has a rectangular housing 11 secured to a supporting structure or base 12. The top surface of housing 11 has an aperture 13 through which a stick 14 is disposed so that the knob or handle 15 may project externally of the housing 11, while the lower portion of the stick is pivotally connected to its universal mounting internally of the housing.

A Sylphon bellows 16 of resilient material, such as rubber, has its lower portion secured to the top of housing 11 around the aperture 13 and its upper portion secured by way of a plate 9 to the elongated body 17 of stick 14. The bellows 16 prevents dust and moisture from entering the housing through aperture 13, yet permits stick 14 to be freely movable.

Secured to the lower portion of stick 14 is a hub 18 having a shaft 19 pivotally mounted in a gimbal frame 20 through apertures such as 21, formed in opposite side portions 22 and 23 of the gimbal frame. Shaft 19 serves as a pivot for athwartship movement of the stick.

Fore and aft movement of the stick is provided by gimbal frame 20, supported by bearing means 28 for pivotally connecting the end portion of the gimbal frame 20 to the upper portion of an upright bracket 25, while the opposite end portion 27 of the gimbal frame has bearing means 29 pivotally connecting end portion 27 to an upright bracket 24, positioned opposite bracket 25. The bearings for pivotally mounting the gimbal frame 20 on the brackets 24 and 25 may be in any convenient form to provide adequate motion of the gimbal frame 20 responsive to fore and aft movement of the stick 14. With the aforesaid arrangement two degrees of freedom are provided for the stick excursions, which are approximately plus or minus thirty degrees in pure pitch or roll displacement, thereby permitting universal movement of the stick within the confines of the stick limiting means 9 as defined by the surfaces of the opening in the plate 8 secured to the controller housing through which the stick emerges.

A sleeve 30 having a central bore 31 therethrough has one end thereof secured to and movable with the end portion 27 of gimbal frame 20, while the opposite end of the sleeve is securely connected to a friction clutch 33 carrying a clutch gear 32 so that the gimbal frame may be rotated upon its bearing means 29 upon rotation of the clutch gear 32 under influence of the pitch synchronizing motor 49.

A roll synchronizing motor 35 stationarily mounted on base 12 has a pinion gear 36 secured on a motor shaft 37. Secured to one end of a drive shaft 34 is a gear 38 which is in mesh with the pinion gear 36. Drive shaft 34 which passes freely through the center of friction clutch 33 and the sleeve 30, has its opposite end secured to the gear 39. A worm gear shaft 40 is mounted in a suitable bearing 41, which is carried by the base 12. On one end of the worm gear shaft 40 is secured a gear 42 which meshes with gear 39, while the other end of the shaft 40 carries a worm gear 43. A worm wheel 44 is secured to one end of a shaft 45 which is rotatably mounted in the side portion 22 of the gimbal frame 20. The opposite end of the shaft 45 is secured to a gear 46 which is in mesh with a friction clutch gear 47 of the friction clutch 48. The friction clutches of the device are of the type set forth in my U.S. Patent 2,616,305.

The worm gear 43 and worm wheel 44 provide an irreversible drive whereby upon athwartship motion of the stick 14, shaft 19 will be rotated, but due to the inherent friction encountered in the irreversible drive of parts 43 and 44, the friction clutch 48 will slip, and no motion will be imparted to the worm gear shaft 40, and consequently there will be no motion imparted to the roll synchronizing motor 35. However, when the stick 14 is released and the roll motor 35 rotates due to energization thereof, the worm gear 43 driven by the motor 35 will drive the worm wheel 44 until the rotation of the shafts 45 and 19 results in restoring the stick 14 to center in its athwartship motion where it is automatically locked, as will be more fully explained hereinafter.

Manual displacement of the stick fore and aft causes shaft 19 to be rocked to and fro, thereby rocking the gimbal frame 20 in the bearing means 28 and 29. The sleeve 30 which is secured to the gimbal frame is connected to the friction clutch 33 through an irreversible drive comprising worm gear 50 and worm wheel 51, and a suitable gear train.

The motor shaft 52 of the pitch motor 49 has secured thereon a gear 53 which is in mesh with a gear 54 secured on one end of the shaft 55, while the worm gear 50 is secured to the opposite end of the shaft 55. Worm wheel 51 is secured to one end of shaft 56 while gear 57 is secured to the opposite end thereof. A gear 58 is in mesh with gear 57 and clutch gear 32. Because of the friction encountered in the irreversible drive comprising worm gear and worm wheel, 50 and 51, respectively, the fore and aft motion of the stick will not rotate the pitch motor 49 due to slippage of the friction clutch 33. Consequently, the stick may be displaced manually without causing rotation of the motor 49. However, when the pitch synchronizing motor 49 is energized, and the stick is released by the human pilot, the irreversible drive will cause the friction clutch gear 32 to be rotated, thereby rocking the gimbal frame 20 accordingly, to restore the stick to center in its fore and after plane of displacement.

It has been shown that the stick of the novel controller may be manually displaced athwartship, and fore and aft, without causing rotation of either the roll or pitch synchronizing motors, due to the slippage of the friction clutch caused by the inherent mechanical resistances of the irreversible drives. Likewise, it has been shown that when the stick is released by the human pilot, rotation of the motors will automatically restore the stick to neutral or centered position.

Normally, the stick of the maneuvering controller is locked in center of its athwartship and fore and aft planes of displacement. In the present invention said locking arrangement is accomplished by electromechanical means. A roll detent solenoid 59 and a pitch detent solenoid 60 are each secured to the gimbal frame in any convenient manner, solenoid 60 being secured by a strap and screws 61. Each of the solenoids are of the plunger type which retract the detent when the solenoid is energized, and have the detent urged away from the solenoid by conventional spring action when the solenoid is deenergized.

The roll detent solenoid 59 locks the stick of the controller in the center of its athwartship displacement. A plate 62 has a wide and tapered face secured transversely to one end of the shaft 19. The detent 63 is secured to the plunger of the solenoid 59, and is withdrawn from the hole 64 formed in the plate 62 when the solenoid is energized, thereby freeing the stick for athwartship displacement.

The pitch detent solenoid 60 locks the stick in neutral or centered position of its fore and aft displacement. A plate 65 having a wide and tapered face like that of the plate 62, is secured transversely to the bracket 25, by screws 61. The detent 67 is secured to the plunger of the solenoid 60 and is withdrawn from the hole 66 formed in the plate 65 when solenoid 60 is energized, thereby freeing the control stick for fore and aft displacement.

The athwartship or lateral displacement of the control stick 14, through suitable linkages and gears, actuates a single phase wound induction device 68 and a three phase wound induction device 69 imparting to said devices approximately ±70 degrees of rotary motion or angular displacement. Coupled with the aforementioned linkages, fore and aft movement of the stick controls a single phase wound induction device 70, imparting thereto approximately ±45 degrees of rotary motion. The induction devices 68, 69 and 70 are shown as specific types of signal transmitters or signal developing means, but it is to be understood that other types of devices may be used for providing a source of signal for the drive motors.

The body portion 17 of the stick has a slot 71 formed therein adjacent the hub 18. A link 72 extends through the slot and is pivoted to the stick by a pivot pin 73, the opposite end of said link being pivotally connected to one end of a control shaft 74 to impart axial and rotary movement to said shaft as the stick is displaced for roll or pitch attitude, respectively, of the craft. The control shaft 74 passes through the center of the bearing means 28 and is freely movable therein. The outer end of said shaft has a pin guide 75 with an annular groove 76 formed therein to receive a guide pin 77 which is movable in the rotatable groove, said pin being secured in one end of a forked lever 78, said lever being pivotally mounted on a pivot pin 79. The forked lever 78 is Z-shaped and has a bifurcated portion 80 which is adapted to slidably engage a stud 81 which extends laterally from and is secured to a gear 82. A shaft 83 connects the gear 82 with inductive device 68. In mesh with gear 82 is a gear 84 connected to inductive device 69 by a shaft 85. A spring actuated centering device 86, including a pin, is connected on the inductive device 68. A metallic link 87 having a portion of insulating material 103 and an electrical conductor portion secured to said insulating material is secured to the upper end portion of the Z-shaped lever 78. Said electrical conductor portion projects to normally extend between a set of electrical contacts 88 affixed to contact springs disposed on opposite sides of an insulating block 89. The free end of link 87 has said electrical conductor portion which slides between and engages the contacts 88 to provide a centering switch for closing an electrical circuit when the stick is in neutral or center of athwartship plane of movement.

Fore and aft movement of the stick operates the inductive device 70. This is accomplished by rotary motion of the shaft 74 which has a bifurcated link 90 secured thereon, with the slot formed at the free end of the link slidably spanning an elongated stud 91 which is secured to a lever 92. One end of the lever 92 has a slidable arm portion 93 which slides through the aperture 94 in a swivel bearing 95 which permits the lever 92 to be moved longitudinally due to rotation of the shaft 74. Likewise, axial movement of the control shaft 74 permits the link 90 to move axially also, without disengagement from the elongated stud 91. A bell crank 96 is secured to the shaft 97 of the inductive device 70, one end of said bell crank being pivotally connected by pin 98 to one end of the lever 92, and the other end thereof having an insulated portion 100, and an electrical conductor portion 101 formed to provide an electrical closure for contacts 99. The contacts 99 are separated by an insulator 102, said electrical conductor portion and contacts 99 forming a centering switch for closing an electrical circuit, to be described more fully hereinafter. This centering switch is normally closed when the stick is in neutral or center position of fore and aft displacement.

To center control stick 14 when released manually in displaced position, motor 49 responds to signals from inductive device 70 and motor 35 responds to signals from inductive device 68.

Each drive motor in the novel controller is shown as being connected with a coupling arrangement including a friction clutch and an irreversible drive for restoring the stick to its normally vertical or centered position. One of the drive motors is used to rotate the gimbal frame of the universal mounting, while the other drive motor rotates a shaft carried by the gimbal frame. The gimbal frame is movable in a first axis of rotation corresponding to the pitch axis, and the shaft, through the supporting medium of the gimbal frame, is movable in a second axis of rotation perpendicular to said first axis.

In actual practice the gear passes or gear trains, linkages, and arrangements of the components in the coupling means may be rather complex. However, for purposes of clarity, simplified specific positional arrangements have been shown for the coupling means including the irreversible drives and friction clutches, along with the linkages, and gear passes.

Figure 4:
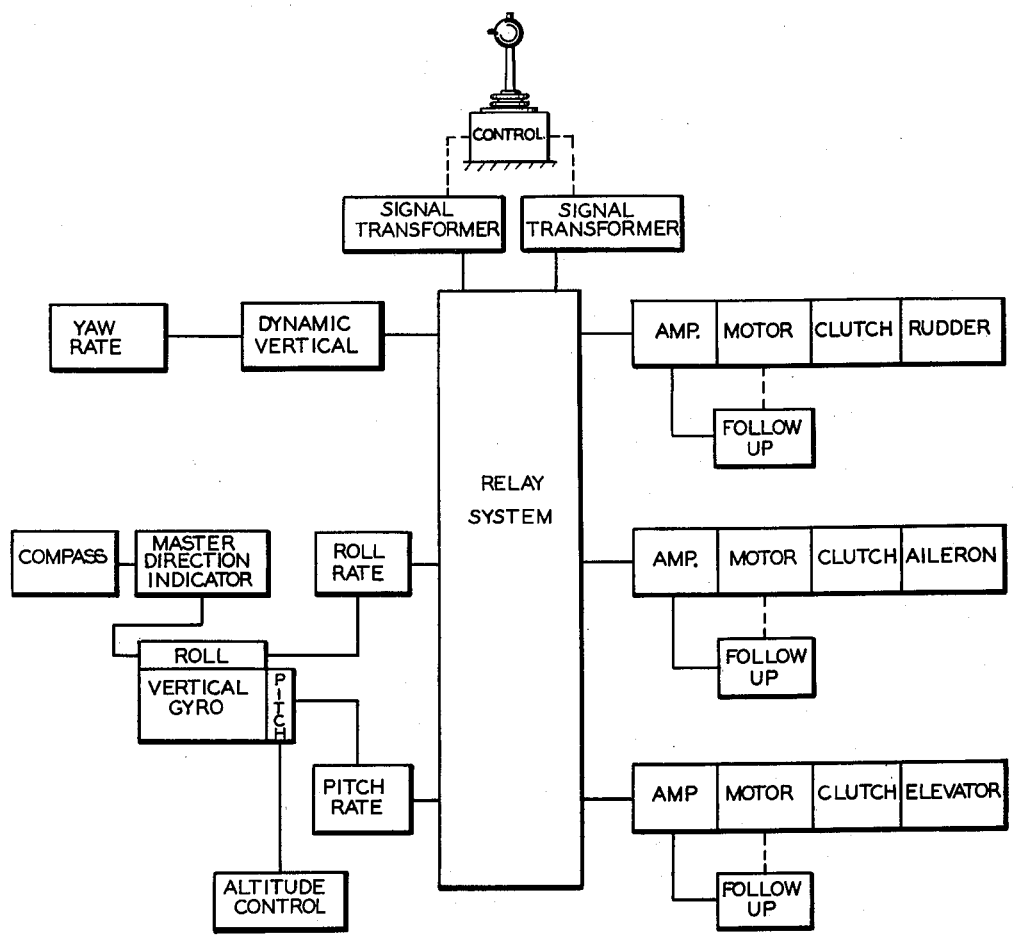
FIG. 4 is a representative block diagram of an auto pilot system in which the controller of the preesnt invention may be employed.

The block diagram of FIG. 4 has appropriate legend in the respective blocks so that the electrical devices shown in FIG. 1 and referred to herein will be understood by a person skilled in the art to which the invention pertains.

In FIGURE 4 is illustrated a schematic automatic pilot system for aircraft usable with the novel controller of the present invention. Such a control system generally comprises rudder, aileron and elevator control channels.

The rudder control channel may include a yaw rate gyro for sensing the rate of turn about the yaw axis, a dynamic vertical sensor for sensing the displacement of the normal vertical from the dynamic vertical, an amplifier for discriminating the signal and raising the level sufficient to operate a motor which, through a suitable clutch, displaces the rudder of the craft so that the extent of displacement will correspond to the error signals from the rate gyro and dynamic vertical. A follow-up device is actuated by the motor to develop a follow-up signal proportional to the actuation to oppose the input signals to the amplifier.

The aileron channel may comprise a compass and master direction indicator for maintaining the craft on a prescribed course, a roll pick-off on the vertical gyro for detecting deviation of the craft from a normal roll attitude, a roll rate gyro for detecting the rate of turn about the roll axis, an amplifier for discriminating these signals and raising their level sufficient to operate a motor which, through a suitable clutch, displaces the aileron surfaces. A follow-up device actuated by the motor opposes the operation of the motor so that the extent of motor operation corresponds to the deviation detected.

The elevator control channel may include a suitable altitude control, a pitch take-off on a vertical gyro and a pitch rate gyro for supplying an input to an amplifier to operate a motor which, through a suitable clutch, actuates the elevator surface to control the pitch attitude. The motor also operates a follow-up device which opposes the motor operation so that the extent of operation corresponds to the error. The operation of the novel controller actuates signal transmitters which, through a suitable relay, operates the aileron and elevator servomotors for manual control of the craft. The relay, switching, and other details of the system are shown and described in a copending application of John C. Owen, Serial No. 559,063, filed even date herewith, now Patent No. 2,953,328, and assigned to the assignee of the present invention.

In the abovementioned John C. Owen application it will be noted that switches H1, H2, and M1, M2 have been illustrated as being operated from the electrically actuated detents 126, 128. In the embodiment of the controller in said John C. Owen application, switches H1 and H2 may be similar to athwartship centering and fore-and-aft centering switches of the present application having parts 101, 102 and 99, and parts 88 and 89 respectively. In the embodiment of said Owen application the centering switches are not actuated by detents, such as 63 and 67 as shown in the present application. The present application utilizes switches actuated by linkages movable from the control shaft 74, which in turn is actuated by the control stick 17. Only one centering switch in each axis has been illustrated but it is obvious that more than one switch may be utilized if desired.

When the detents 63 and 67 are received in holes 64 and 66 in plates 62 and 65, respectively, depressing either button 14ᵃ or 14ᵇ energizes solenoids 59 and 60 and withdraws detents 63 and 67 from holes 64 and 66, respectively. Thereafter stick 14 may be moved freely in pitch and roll, to open switches 99, 100 and 88, 103.

Referring to the aforementioned Owen copending application the switches may be utilized for the operation of an interlock to prevent the displacement and rate modes of operation from being actuated simultaneously or to render the compass or heading control ineffective on the automatic control system when the craft is being manually controlled about the roll axis to render the altitude control ineffective on the craft when the craft is being manually controlled about the pitch axis.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A manual controller for an automatic control system for mobile craft, comprising a supporting structure, universal mounting means carried on said supporting structure, manually operable control means normally centered relative to the supporting structure and connected to said universal mounting means, signal transmitters for mutually perpendicular channels of said control system, means interconnecting said control means and said transmitters for activating said transmitters to develop a signal by at least one of said transmitters in response to movement of said control means from its normally centered position, and motor means drivably connected to said universal mounting means and responsive to signals from the transmitters for urging said control means to its normally centered position when released from manual operation.

2. A manual controller for an automatic pilot system having bank and pitch channels for mobile craft comprising a supporting structure, universal mounting means carried by said supporting structure and having a manually operable control stick normally centered relative to the supporting structure and connected thereto, signal transmitters for the bank channel and the pitch channel of the pilot system, means interconnecting said control stick and said transmitters for actuating said transmitters to develop a signal by said transmitters responsive to movement of the control stick from its normally centered position, and drive means drivably connected to said universal mounting means and responsive to signals from the transmitters for urging said control stick into its normally centered position when released from manual operation.

3. A stick controller for an automatic pilot system having bank and pitch channels for mobile craft comprising a supporting structure, a universal mounting carried by said supporting structure and having a normally centered control stick connected thereto, signal transmitters for the bank channel and the pitch channel of the pilot system, means interconnecting said control stick and said transmitters for actuating said transmitters to develop a signal in response to movement of the control stick from its normally centered position, coupling means including a clutch and an irreversible drive connected to the universal mounting, and drive means connected to each of said coupling means for urging said control stick its normally centered position.

4. A stick controller as set forth in claim 3, wherein said clutch is of the friction type.

5. A stick controller for an automatic pilot system having bank and pitch channels for mobile craft comprising a supporting structure, a universal mounting carried on said supporting structure and having a normally centered control stick connected thereto, signal transmitters for the bank channel and the pitch channel of the pilot system, means interconnecting said control stick and said transmitters for actuating said transmitters to develop a signal in response to movement of the control stick from its normally centered position, a drive motor drivably connected to the universal mounting for urging said control stick into its centered position, and releasable locking means for holding said stick in its normally centered position.

6. A stick controller for an automatic pilot system having a control channel for each of a plurality of aircraft control surfaces comprising a supporting structure, a universal mounting carried by said supporting structure and having a normally centered control stick connected thereto, a signal transmitter for each said control channel of the pilot system, means interconnecting said control stick and said transmitter responsive to movement of the control stick from its normally centered position, a pair of coupling means each including a friction clutch means and an irreversible drive means, and a drive motor connected to each of said coupling means for urging said control stick into its centered position, the coupling means for one of said drive motors being interconnected to said universal mounting for moving same responsive to actuation of its respective drive motor.

7. A stick controller for an automatic pilot system having a control channel for each of a plurality of aircraft control surfaces comprising a supporting structure, universal mounting means including a shaft and having two axes of rotation carried on said supporting structure and having a normally centered control stick connected thereto, a signal transmitter for each said control channel of the pilot system, means interconnecting said control stick and said transmitters responsive to movement of the control stick from its normally centered position, a pair of coupling means, each coupling means including a friction clutch means and an irreversible drive means, and a drive motor connected to each of said coupling means for urging said control stick into centered position, the coupling means for one of said drive motors being interconnected to said universal mounting means for rotating same in one of said axes of rotation, and the other of said coupling means being interconnected to the shaft of said universal mounting for moving said shaft in the other of said axes of rotation, whereby, when the stick is released by the human pilot it may be restored to said centered position.

8. A stick controller for an automatic pilot system having a control channel for each of a plurality of aircraft control surfaces comprising a supporting structure, a universal mounting including a shaft and having two axes of rotation carried on said supporting structure and having a normally in center stick connected thereto, a signal transmitter for each said control channel of the pilot system, means interconnecting said control stick and said transmitters responsive to movement of the control stick from its normally centered position, a pair of coupling means each including a friction clutch means and an irreversible drive means, a drive motor connected to each of said coupling means for urging said control stick into its centered position, the coupling means for one of said drive motors being interconnected to said universal mounting for rotating same in one of said axes of rotation, and the other of said coupling means being interconnected to the shaft of said universal mounting for moving the stick in the other of said axes of rotation, and releasable locking means for holding said universal mounting and said shaft carried thereby for maintaining said stick locked in said center position.

References Cited in the file of this patent

UNITED STATES PATENTS

| | | |
|---|---|---|
| 1,923,290 | Wood | Aug. 22, 1933 |
| 2,475,484 | De Nise | July 5, 1949 |
| 2,504,604 | Tear | Apr. 18, 1950 |
| 2,611,559 | Meredith | Sept. 23, 1952 |
| 2,614,776 | Rossire | Oct. 21, 1952 |
| 2,695,145 | Lear | Nov. 23, 1954 |
| 2,740,082 | Sedgfield | Mar. 27, 1956 |
| 2,762,123 | Schultz | Sept. 11, 1956 |